United States Patent [19]

Strohecker

[11] 3,779,385
[45] Dec. 18, 1973

[54] APPARATUS FOR REMOVING OIL AND OTHER FLOATING CONTAMINANTS FROM A MOVING BODY OF WATER

[75] Inventor: John W. Strohecker, Oak Ridge, Tenn.

[73] Assignee: The United States of America, as represented by the United States Atomic Energy Commission, Washington, D.C.

[22] Filed: Nov. 30, 1971

[21] Appl. No.: 203,267

[52] U.S. Cl................... 210/154, 61/18, 61/28, 210/242
[51] Int. Cl................... E02b 5/08, E02b 7/28
[58] Field of Search............ 210/197, 153, 154, 210/170, 222, 169; 137/236; 61/1 F, 23–30

[56] References Cited
UNITED STATES PATENTS

| | | | |
|---|---|---|---|
| 3,252,576 | 5/1966 | Miller | 210/169 |
| 320,545 | 6/1885 | Doughton | 210/154 |
| 3,638,796 | 2/1972 | Tuggle et al. | 210/170 |
| 1,139,104 | 5/1915 | Coller | 137/236 X |
| 2,010,249 | 8/1935 | Adams | 61/29 |
| 832,463 | 10/1906 | Engelbrecht | 210/153 |
| 2,673,451 | 3/1954 | Gariel | 210/154 |

Primary Examiner—Samih N. Zaharna
Assistant Examiner—T. A. Granger
Attorney—Roland A. Anderson

[57] ABSTRACT

Floating contaminants such as oil and solid debris are removed from a moving body of water by employing a skimming system which utilizes the natural gravitational flow of the water. A boom diagonally positioned across the body of water diverts the floating contaminants over a floating weir and into a retention pond where an underflow weir is used to return contaminant-free water to the moving body of water. The floating weir is ballasted to maintain the contaminant-receiving opening therein slightly below the surface of the water during fluctuations in the water level for skimming the contaminants with minimal water removal.

2 Claims, 4 Drawing Figures

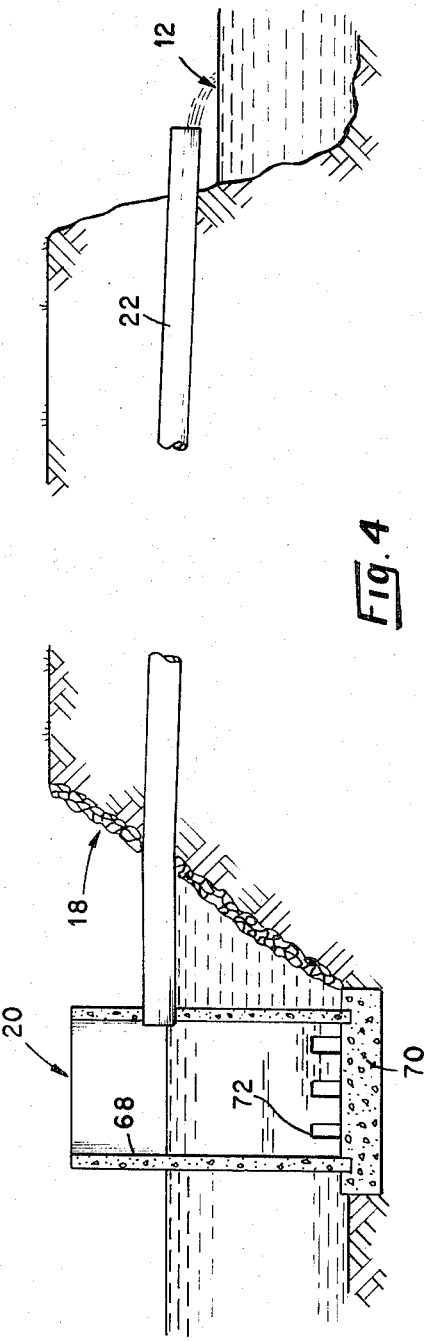

APPARATUS FOR REMOVING OIL AND OTHER FLOATING CONTAMINANTS FROM A MOVING BODY OF WATER

The present invention relates generally to the removal of floating liquid and solid contaminants from a moving body of water, and more particularly to a skimming system which removes such continents by utilizing the gravitational flow of the water and which is self-adjusting during fluctuations in the water level to provide for minimal water removal along with the contaminants. This invention was made in the course of, or under, a contract with the U. S. Atomic Energy Commission.

The control of pollution in moving bodies of water is of significant importance in combating overall environmental pollution. Floating pollutants or contaminants such as oil and other liquids immiscible with water as well as solid debris are commonplace in rivers and streams near industrial and populous areas. Efforts to remove such floating contaminants include various complex skimming devices with the most emphasis being placed upon devices capable of skimming or otherwise removing oil from the water. Some success has been achieved in the removal of oil by using such apparatus as belt-type skimmers but these skimmers, like other previously known skimmers, suffer shortcomings or drawbacks which detract from their usefulness. For example, solid floating debris often clogs the skimmers to significantly reduce their efficiency. Also, fluctuating water levels impair the operation of the skimmers.

Accordingly, it is a primary objective or aim of the present invention to provide a floating-contaminant skimming system which utilizes the natural gravitational flow of a stream or river for effectively separating floating liquid and solid contaminants carried thereby. Generally, the present invention is directed to a system for separating floating liquid and solid contaminants from a moving body of water. The system comprises, in combination, means projecting across the body of water and contiguous with the surface thereof for intercepting solid and water immiscible matter floating on said surface and directing the intercepted matter to a selected location upstream of said means, a weir in registry with said location and having a passageway therethrough for receiving said matter, conduit means in registry with said weir for conducting the matter received by said passageway away from said body of water, and ballast means connected to said weir for vertically displacing the latter to maintain a portion of the latter defining said passageway below but adjacent to said surface. The contaminants removed from the body of water are discharged into a retention basin containing an underflow weir which provides for the discharge of clarified water from the basin for return to the body of water or to any other suitable location.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

In the accompanying drawings:

FIG. 4 is an elevational view taken along lines 4—4 of FIG. 1 illustrating the underflow weir in the contaminant retention basin and the return of the contaminant-free water to the moving body of water.

Figure 1:
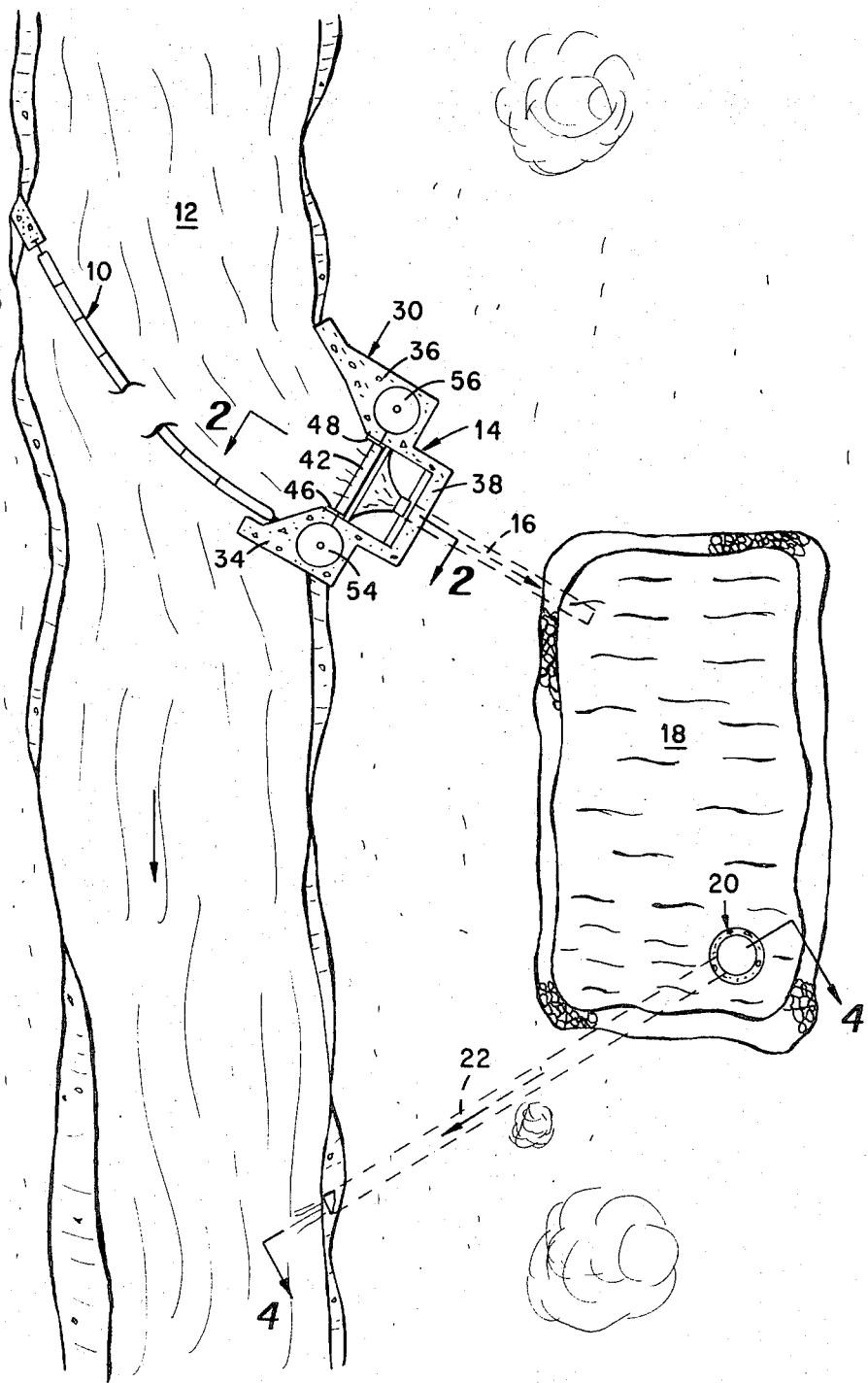
FIG. 1 is a somewhat schematic plan view of the contaminant skimming system of the present invention as it would be employed with a moving body of water.

Described generally and with reference to the drawings the present invention relates to skimming system for separating or removing floating liquid and solid contaminants from streams, rivers and similar flowing bodies of water by utilizing the natural gravitational flow of the water. The contaminant skimming system is shown comprising a diversion boom 10 positioned diagonally across a stream 12 and in registry with the surface of the latter for intercepting and diverting floating contaminants into a weir 14 which is located in the stream bank upstream from but adjacent to the downstream end of the boom 10. The weir 14 is ballasted so that the water-borne contaminants are directed through or over the weir with a minimal amount of water during fluctuations in the stream level. The contaminants passed through the wier are conveyed through a conduit 16 and discharged into a retention basin 18 which contains an underflow weir 20. Clarified water beneath the contaminants gathered in the retention basin flows through weir 20 into a further conduit 22 which conveys the water back to the stream 12, as shown.

The diversion boom 10 may be of any suitable construction which will provide for the diversion of the solid and liquid floating contaminants into the weir 14. As shown, the boom is formed of a series of elongate buoys 24 joined together to form a continuous floating structure which spans the stream 12 and provides a suitable contaminantintercepting structure. The buoys are preferably provided with an underlying skirt portion 26 which projects vertically therefrom into the water to add strength to the boom and to assure that the latter extends a sufficient depth into the water to intercept the contaminants. The boom 10 is preferably supported at the ends thereof in such a manner as to allow for vertical adjustment of the boom in response to fluctuations in the depth of the stream 12. Satisfactory results have been achieved by using a simple key and keyway arrangement such as shown at 28 at each end of the boom. With this arrangement the ends of the boom are slidably mounted in the keyways so as to be self-adjusting in response to water level for effectively diverting the contaminants into the weir regardless of stream depth while providing for adequate passage of floating contaminant-free water under the boom. While this boom construction has been found to function satisfactorily, other constructions may also be suitable. For example, a boom may be fabricated from a solid dam-like structure with openings therethrough below the normal minimum level of the stream so as to provide for adequate flow of the stream and yet divert the floating contaminants into the weir.

Figure 2:
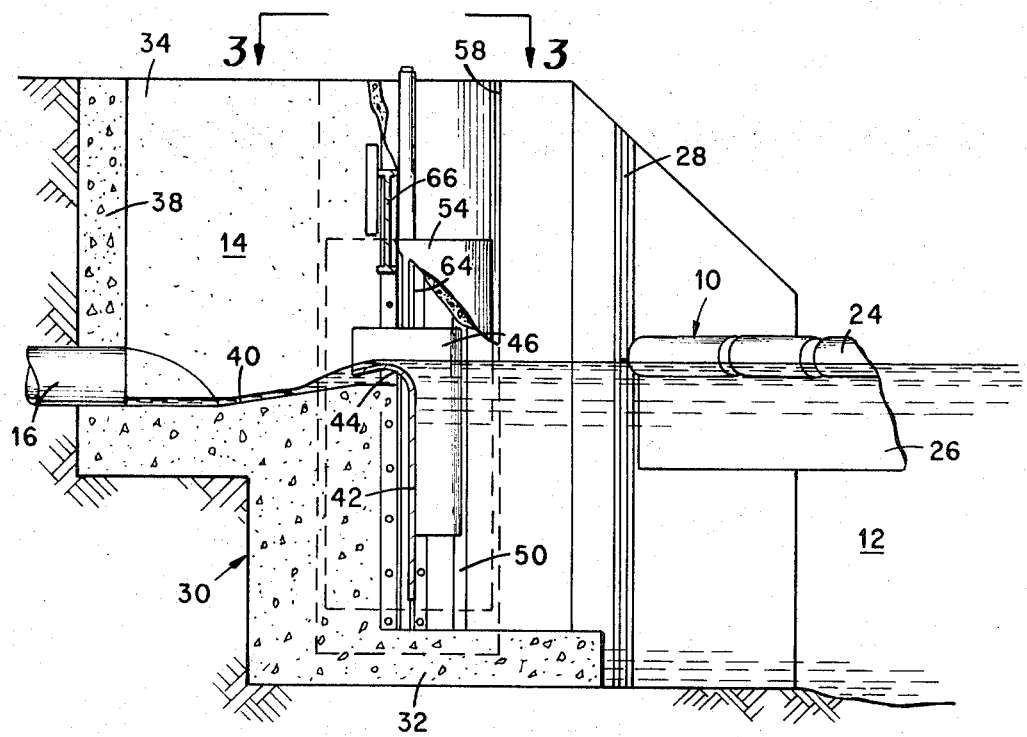
FIG. 2 is a sectioned elevational view taken along lines 2—2 of FIG. 1 and showing details of the floating, self-adjusting weir.
Figure 3:
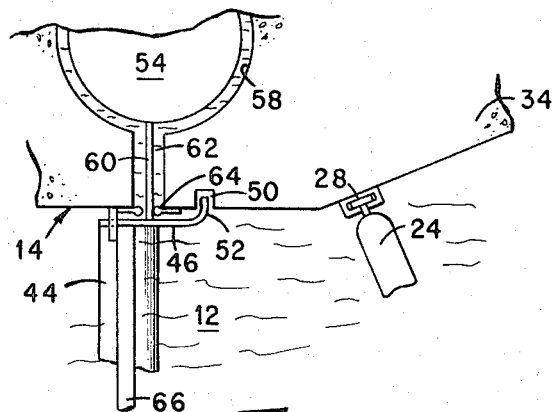
FIG. 3 is plan view taken along lines 3—3 of FIG. 2 showing the relationship of one of ballast tanks to the floating weir.

As shown, the weir 14 comprises a concrete shell 30 embedded in the stream bank with the base 32 of the shell 30 at a level corresponding to the bottom of the stream 12. The concrete shell has generally U-shaped side walls 34 and 36 joined to the base 32 and an end wall 38 and provided with end portions remote to the end wall which flare outwardly to facilitate reception of the floating contaminants. The end wall 38 has a substantially laterally disposed shelf or shoulder 40 projecting therefrom for providing the weir with a water and contaminant receiving platform. The conduit 16 used to convey the contaminants into the retention basin is in registry with this platform which is preferably at a level corresponding to a level slightly below the normal minimum water level of the stream. In order to control the discharge of the water-borne contaminants through the weir and into the conduit 16 the weir is provided with a vertically adjustable gate 42 extending between the side walls 34 and 36 and provided with a flange 44 at the upper end thereof which overlies a portion of the platform as shown. The gate 42 is vertically adjustable between the sidewalls of the base 30 so as to form a passageway for regulating the flow of water through the weir in response to the vertical position or location of the gate. The gate 42 is provided with skirt-like projections 46 and 48 at sides thereof adjacent the side walls of the shell and projecting upwardly from the top of the gate for guiding contaminants over the flange 44 and also for providing a seal-like arrangement with the shell 30 for preventing the passage of floating contaminants and water around the sides of the vertically adjustable gate 42. This seal may be satisfactorily achieved by providing the side walls 34 and 36 of the shell with vertically extending slots, one of which is shown at 50 in FIGS. 2 and 3, for receiving a lip-like projection 52 on the skirts 46 and 48.

The ballasting or self-adjustment of the weir in response to stream level fluctuations is achieved by employing water operated ballast tanks 54 and 56 which are connected to the vertically movable gate 42 and disposed in suitable vertically oriented wells or silo-like holes 48 in the shell 30 at locations near the gate 42. The coupling or connection between the ballast tanks and the gate 42 may be provided by a bar or rod such as shown at 60 with the bar projecting through an elongated, vertically disposed slot 62 in the shell 30. To assure that the wells containing the ballast tanks will not be filled with solid debris so as to impair the movement of the ballast tanks in response to changing water levels, the shell 30 may be provided with suitable vertically extending seal-like structures 64 made of neoprene or any other suitable material at the opening to the slot 62. The seal-like structures 64 while preventing the flow of solid debris into the ballast-tank wells do not impair the flow of water into the latter so as to insure the operation of the ballast tanks. In operation of the self-adjusting weir a fluctuation in the water level will cause the ballast tanks to move up or down and vertically position the gate 42 of the weir so as to control the quantity of water flowing over the gate into the conduit 16. Satisfactory removal of the floating contaminants has been achieved by positioning the top of the metal gate 42 about one inch below the surface of the water. This position of the gate with respect to the surface of the stream is effective for the removal of the solid and liquid contaminants and yet prevents the flow of a relatively large quantity of water through the weir which may overload the retention basin or conduit 16 or render cumbersome the return of the clarified water to the stream and the settling of the contaminants in the retention basin.

In the event the water level of the stream increases to the extent the weir may be overloaded such as would be caused by flooding, it may be desirable to seal off the weir. Such a closing of the weir may be achieved by placing a dam-like beam or barrier 66 between the side walls of the shell 30 at a location thereon slightly above normal maximum stream levels present during non-flooding conditions. With this arrangement the flange 44 of the gate 42 is moved up against the bottom of the beam so as to seal off the passageway through the weir.

The water and the solid contaminants contained therein which pass over the weir 14 into the conduit 16 flow by gravity through the latter into the retention basin 18. This basin is preferably of sufficient volume so as to permit further separation of the contaminants from the water as normally occurs over a period of time and is of a sufficient depth so that the clarified water at the lower depths may be returned to the stream 12 without causing or contributing to the pollution thereof. This return of the clarified water is achieved by the underflow weir 20 which is constructed of a tubulation or cylinder 68 vertically disposed in the deepest portion of the retention basin 18 on a suitable base 70 and projecting to a location above the surface of the water. Openings 72 adjacent the lowermost end of the cylinder 68 provide for inflow of water into the cylinder 68 while conduit 22 in registry with the interior of the cylinder 68 at a location near the center thereof removes the water from the weir for return to the stream 12 by gravitational flow. While it is desirable to use the weir 20 in the retention basin 18 for separating the clarified water from the floating contaminants, it may be, in some instances, possible to omit the weir. For example, if adequate gravitational flow of water from the retention basin back to the stream may be obtained by placing the open conduit 22 in registry with basin near its bottom then the weir may be omitted. However, with this arrangement the discharge end of conduit 22 should be higher than the end of the conduit within the basin to maintain the water in the basin at a level somewhat above the conduit 22.

It will be seen that the present invention provides a significant improvement in the art of removing floating contaminants from moving bodies of water. A significant feature of the present invention is that no outside power such as electrical or mechanical power is required since its operation utilizes the normal gravitational flow of the water. Further, the self-adjusting weir provides for the removal of only a minimal quantity of water while effecting the removal of the captured floating contaminants from the stream.

What is claimed is:

1. A system for separating floating liquid and solid contaminants from a moving body of water comprising in combination, means projecting across said body of water and contiguous with the surface thereof for intercepting solid and water-immiscible matter floating on said surface and directing the intercepted water-borne matter to a selected location upstream of said means, a weir in registry with said location and having a passageway therethrough for receiving said matter, ballast means connected to said weir and movable in response to the level of said body of water at said location for vertically displacing the weir to maintain a portion of the latter defining said passageway below but adjacent to said surface, a water receiving volume disposed at a locale remote to said body of water, conduit means in registry with said weir and said water receiving volume for conducting the matter received by said passageway away from said body of water and into said water receiving volume by gravitational flow, a tubulation disposed in said water receiving volume in a vertical orientation with a portion thereof projecting above the surface of the water in said water receiving volume passageways in the tubulation adjacent to the lowermost end thereof providing communication between the water in said water receiving volume and the interior of said tubulation, and further conduit means in registry with the interior of said tubulation for conveying water essentially free of said matter away from said water receiving volume by gravitational flow.

2. A system for separating floating liquid and solid contaminants from a moving body of water as claimed in claim 1, wherein said weir comprises a shell having vertically oriented spaced apart side walls and a vertically movable gate extending between said side walls for defining said passageway through said weir, said ballast means comprises buoyant tank means disposed in said side walls and connected to said gate, and wherein said tank means are in registry with said body of water at said location for effecting the flotation thereof and the vertical displacement of said gate in response to the level of said body of water at said location.

* * * * *